(12) United States Patent
Wang

(10) Patent No.: US 11,137,084 B2
(45) Date of Patent: Oct. 5, 2021

(54) SOLENOID VALVE FOR ACTIVITY TEST OF EXTRACTION CHECK VALVE

(71) Applicant: Ningxia Danchen Technology Co., LTD, Yinchuan (CN)

(72) Inventor: Jisheng Wang, Yinchuan (CN)

(73) Assignee: NINGXIA DANCHEN TECHNOLOGY CO., LTD, Yinchuan (CN)

( * ) Notice: Subject to any disclaimer, the term of this patent is extended or adjusted under 35 U.S.C. 154(b) by 209 days.

(21) Appl. No.: 16/568,975

(22) Filed: Sep. 12, 2019

(65) Prior Publication Data

US 2020/0326002 A1 Oct. 15, 2020

(30) Foreign Application Priority Data

Apr. 11, 2019 (CN) .......................... 201910288255.5

(51) Int. Cl.

| | |
|---|---|
| *F16K 15/18* | (2006.01) |
| *F16K 17/10* | (2006.01) |
| *F16K 31/04* | (2006.01) |
| *F16K 15/03* | (2006.01) |
| *F16K 31/05* | (2006.01) |
| *F16K 39/02* | (2006.01) |

(52) U.S. Cl.
CPC ............ *F16K 15/18* (2013.01); *F16K 15/033* (2013.01); *F16K 17/10* (2013.01); *F16K 31/046* (2013.01); *F16K 31/05* (2013.01); *F16K 39/026* (2013.01)

(58) Field of Classification Search
CPC ........ F16K 15/18; F16K 39/026; F16K 17/10; F16K 17/196; F16K 17/105; F16K 17/168; F16K 31/05; Y10T 137/8671; Y10T 137/86767; Y10T 137/87185
See application file for complete search history.

(56) References Cited

U.S. PATENT DOCUMENTS

| | | | | |
|---|---|---|---|---|
| 2,220,479 | A | * | 11/1940 | De Bell .................. F16K 17/00 137/596.13 |
| 2,289,567 | A | * | 7/1942 | Berglund ................ F15B 13/08 137/596.13 |
| 3,605,806 | A | * | 9/1971 | Coatti ..................... F15B 13/08 137/596.13 |

(Continued)

*Primary Examiner* — Reinaldo Sanchez-Medina
*Assistant Examiner* — Nicole Gardner
(74) *Attorney, Agent, or Firm* — Harness, Dickey & Pierce, P.L.C.

(57) ABSTRACT

A solenoid valve includes a main valve, a first auxiliary valve, a second auxiliary valve, a main valve body, and an auxiliary valve body. The main and auxiliary valve bodies are axially parallel and detachably connected. The main valve is mounted on the main valve body, the first and second auxiliary valves are mounted on the auxiliary valve body, which is provided with an air inlet, a cylinder port and an air discharging port. The air inlet communicates with the main valve through a first air passage. The cylinder port is sequentially in communication with the first and second auxiliary valves and the main valve through a second air passage. The air discharging port sequentially communicates with the first and second auxiliary valves and the main valve through a third air passage. The main and second auxiliary valves are solenoid valves. The first auxiliary valve is a hand-operated valve.

10 Claims, 3 Drawing Sheets

(56) References Cited

U.S. PATENT DOCUMENTS 4,099,541 A * 7/1978 Binkley ................ F15B 13/08
                                                                     137/596.13
4,589,437 A * 5/1986 Zeuner ................ F15B 13/0402
                                                                     137/115.03

* cited by examiner

SOLENOID VALVE FOR ACTIVITY TEST OF EXTRACTION CHECK VALVE

CROSS-REFERENCE TO RELATED APPLICATIONS

This application claims priority to Chinese application number 201910288255.5, filed Apr. 11, 2019, with a title of SOLENOID VALVE FOR ACTIVITY TEST OF EXTRACTION CHECK VALVE. The above-mentioned patent application is incorporated herein by reference in its entirety.

FIELD

The present disclosure relates to the technical field of electromagnetic valves, and in particular to a solenoid valve for an activity test of an extraction check valve.

BACKGROUND

An extraction check valve is a valve device that is installed on a steam extraction pipe of a steam turbine to prevent steam in a heater or a heat pipe from returning to the steam turbine to cause a galloping accident when a generator trips out and a main air valve is switched off, and at the same time prevents feed water from entering the steam turbine from the steam extraction pipe to cause a water hammer accident when a copper pipe of the heater leaks. The valve is a key valve for protecting the steam turbine. The valve is switched off by means of a single-acting cylinder. When the single-acting cylinder is in a working state, a spring thereof is in a compressed state for a long time under the pressure of the air pressure. When the spring is in the compressed state for a long time, fatigue will occur and the spring will lose elasticity. In addition, the single-acting cylinder is inactive for a long time and is prone to jams. In order to ensure the reliability of the cylinder, it becomes extremely important to prevent the cylinder spring from failing, and to find out in time that the spring force is insufficient and the cylinder is stuck. For the safety of the steam turbine, under normal circumstances, the extraction check valve should be tested at least once in one month. An existing method is to add a hand-operated valve besides the solenoid valve for controlling the single-acting cylinder as the bypass decompression to do the activity test. The hand-operated valve limits the activity test, so that the activity test can only be carried out locally, which cannot meet the remote intelligent operation of a smart power plant.

Therefore, it is an urgent problem to be solved to provide a solenoid valve for an activity test of an extraction check valve which can meet the requirements for remote intelligent operation of a smart power plant.

SUMMARY

The present disclosure provides a solenoid valve for an activity test of an extraction check valve to solve the above problems in the prior art, so that the activity test of the extraction check valve can be operated remotely.

To achieve the above purpose, the present disclosure provides the following technical solutions.

A solenoid valve for an activity test of an extraction check valve includes a main valve, a first auxiliary valve, a second auxiliary valve, a main valve body and an auxiliary valve body, where the main valve body and the auxiliary valve body are axially parallel and detachably connected, the main valve is mounted on the main valve body, the first auxiliary valve and the second auxiliary valve are mounted on the auxiliary valve body, and the auxiliary valve body is provided with an air inlet, a cylinder port and an air discharging port; the air inlet is in communication with the main valve through a first air passage, the cylinder port is sequentially in communication with the second auxiliary valve, the first auxiliary valve and the main valve through a second air passage, and the air discharging port is sequentially in communication with the second auxiliary valve, the first auxiliary valve and the main valve through a third air passage; the main valve and the second auxiliary valve are solenoid valves, and the first auxiliary valve is a hand-operated valve.

Preferably, a heat dissipation grille is provided on the auxiliary valve body.

Preferably, the heat dissipation grille is disposed on the side of the auxiliary valve body.

Preferably, the main valve body is connected to the auxiliary valve body through a bolt.

Preferably, the main valve includes a main valve sleeve, a main valve core and a first drive coil; the first drive coil is disposed on one side of the main valve body, the first drive coil is used for driving the main valve core to move, the main valve sleeve is disposed inside the main valve body, and the main valve core is disposed inside the main valve sleeve; the first air passage, the second air passage and the third air passage are in communication with the main valve sleeve, two first shoulders are disposed on the outer surface of the main valve core in the axial direction of the main valve core, and the outer surface of each of the first shoulders is attached to the inner surface of the main valve sleeve.

Preferably, a first spring is disposed between the inner bottom end of the main valve sleeve and the main valve core.

Preferably, the first auxiliary valve includes a first auxiliary valve sleeve and a first auxiliary valve core, where the first auxiliary valve sleeve is disposed inside the auxiliary valve body, one end of the first auxiliary valve core extends into the auxiliary valve sleeve, the first auxiliary valve sleeve is in communication with the second air passage and the third air passage, two second shoulders are disposed on the outer surface of the first auxiliary valve core in the axial direction of the first auxiliary valve core, and the outer surface of each of the second shoulders is attached to the inner surface of the first auxiliary valve sleeve.

Preferably, one side of the auxiliary valve body is provided with a limiting cavity, the other end of the first auxiliary valve core is connected to a manual push rod, the manual push rod passes through the limiting cavity and extends out, a limiting block is circumferentially disposed on the outer surface of the manual push rod, and the limiting block is clamped in the limiting cavity; the first auxiliary valve further includes a second spring and a third spring, where the second spring is disposed between the inner bottom end of the first auxiliary valve sleeve and the first auxiliary valve core, the manual push rod is sleeved with the third spring, and the third spring is disposed between the inner bottom end of the limiting cavity and the limiting block.

Preferably, the second auxiliary valve includes a second auxiliary valve sleeve, a second auxiliary valve core and a second drive coil, where the second drive coil is disposed on one side of the auxiliary valve body, the second drive coil is used for driving the second auxiliary valve core to move, the second auxiliary valve sleeve is disposed inside the auxiliary valve body, the second auxiliary valve core is disposed inside the second auxiliary valve sleeve, the second auxiliary valve sleeve is in communication with the second air passage and the third air passage; two third shoulders are disposed on the outer surface of the second auxiliary valve core in the axial direction of the second auxiliary valve core, and the outer surface of each of the third shoulders is attached to the inner surface of the second auxiliary valve sleeve.

Preferably, the second auxiliary valve includes a fourth spring and the fourth spring is disposed between the inner bottom end of the second auxiliary valve sleeve and the second auxiliary valve core.

Compared with the prior art, the present disclosure achieves the following technical effects:

In the solenoid valve for an activity test of an extraction check valve provided by the present disclosure, a hand-operated valve of a first auxiliary valve is used for on-site local activity test, a second auxiliary valve is used for remote operation of the solenoid valve to carry out an activity test of the extraction check valve, so that the solenoid valve for an activity test of an extraction check valve can locally perform the activity test of the extraction check valve and can also remotely perform the activity test of the extraction check valve, and the solenoid valve for an activity test of an extraction check valve has multiple functions, is convenient to use and can meet the requirements for a smart power plant.

BRIEF DESCRIPTION OF THE DRAWINGS

To describe the technical solutions in the examples of the present disclosure or in the prior art more clearly, the following briefly describes the accompanying drawings required for describing the examples. Apparently, the accompanying drawings in the following description show some examples of the present disclosure, and a person of ordinary skill in the art may still derive other drawings from these accompanying drawings without creative efforts.

In FIGS. 1 to 3:
1. bolt, 2. main valve body, 3. main valve sleeve, 4. main valve core, 5. first shoulder, 6. first spring, 7. first drive coil, 8. first auxiliary valve sleeve, 9. first auxiliary valve core, 10. second shoulder, 11. second spring, 12. limiting cavity, 13. limiting block, 14. third spring, 15. second drive coil, 16. second auxiliary valve sleeve, 17. second auxiliary valve core, 18. third shoulder, 19. fourth spring, 20. air inlet, 21. cylinder port, 22. air discharging port, 23. first air passage, 24. second air passage, 25. third air passage, 26. heat dissipation grille, 27. O-shaped seal ring, 28. manual push rod, 29. auxiliary valve body.

DETAILED DESCRIPTION

The following clearly and completely describes the technical solutions in the examples of the present disclosure with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

An objective of the present disclosure is to provide a solenoid valve for an activity test of an extraction check valve to solve the problems in the prior art, so that the activity test of the extraction check valve can be operated remotely.

To make the foregoing objective, features, and advantages of the present disclosure clearer and more comprehensible, the present disclosure is further described in detail below with reference to the accompanying drawings and specific examples.

Example 1

Figure 1:
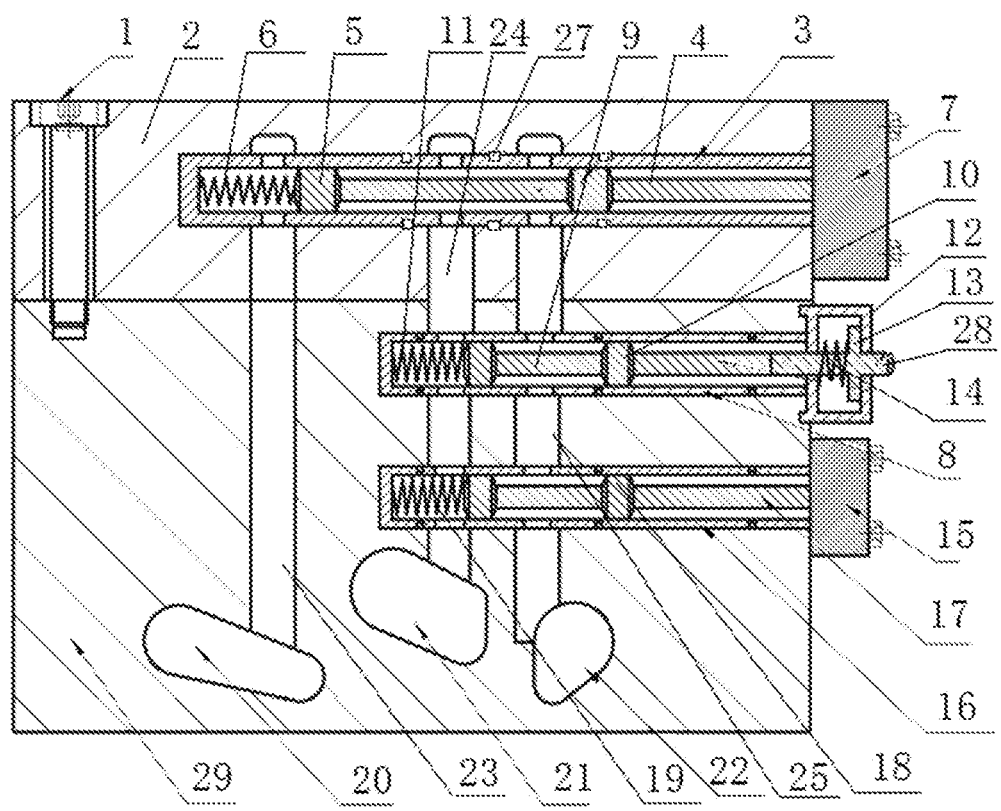
FIG. 1 is a schematic structural view of a solenoid valve for an activity test of an extraction check valve provided by the present disclosure.

As shown in FIG. 1, this example provides a solenoid valve for an activity test of an extraction check valve, including a main valve, a first auxiliary valve, a second auxiliary valve, a main valve body 2 and an auxiliary valve body 29, where the main valve body 2 and the auxiliary valve body 29 are axially parallel and detachably connected, the main valve is mounted on the main valve body 2, the first auxiliary valve and the second auxiliary valve are mounted on the auxiliary valve body 29, and the auxiliary valve body 29 is provided with an air inlet 20, a cylinder port 21 and an air discharging port 22; the air inlet 20 is in communication with the main valve through a first air passage 23, the cylinder port 21 is sequentially in communication with the second auxiliary valve, the first auxiliary valve and the main valve through a second air passage 24, and the air discharging port 22 is sequentially in communication with the second auxiliary valve, the first auxiliary valve and the main valve through a third air passage 25. The main valve and the second auxiliary valve are solenoid valves, and the first auxiliary valve is a hand-operated valve. Through the arrangement of the second auxiliary valve, the solenoid valve for an activity test of an extraction check valve can achieve the remote activity test. The solenoid valve for an activity test of an extraction check valve can be locally operated and can also be remotely operated, has various functions and is convenient to use.

In the specific use process, the air inlet 20 is in communication with an air source, the cylinder port 21 is in communication with the air inlet position of a single-acting cylinder. When a local activity test is required, the hand-operated valve acts while the main valve operates, and the second air passage 24 is in communication with the third air passage 25 by gas through the first auxiliary valve. Some gas is discharged through the air discharging port 22, the cylinder pressure is reduced, and a cylinder piston rod operates in a direction in which the extraction check valve is switched off. When the piston rod descends to one-third of the length of a main valve rod, the hand-operated valve is loosened, the first auxiliary valve returns, and the second air passage 24 and the third air passage 25 are in a closed state. At this time, the cylinder piston rod operates in a direction in which the extraction check valve is switched on, and the local activity test ends. When a remote activity test is required, the second auxiliary valve is energized while the main valve operates, so that the second auxiliary valve acts; the second air passage 24 is in communication with the third air passage 25 by gas through the second auxiliary valve. Some gas is discharged through the air discharging port 22, the cylinder pressure is reduced, and a cylinder piston rod operates in a direction in which the extraction check valve is switched off. When the piston rod descends to one-third of the length of the main valve rod, the second auxiliary valve is powered off and returns, and the second air passage 24 and the third air passage 25 are in a closed state. At this time, the cylinder piston rod operates in a direction in which the extraction check valve is switched on, and the remote activity test ends.

Figure 2:
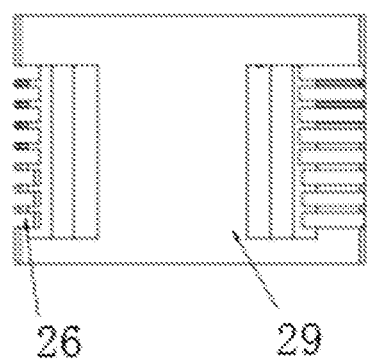
FIG. 2 is a schematic view showing a manner for setting a heat dissipation grille of a solenoid valve for an activity test of an extraction check valve provided by the present disclosure.
Figure 3:
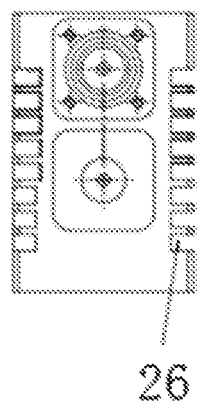
FIG. 3 is a vertical view of FIG. 2.

In some examples, as shown in FIGS. 2-3, a heat dissipation grille 26 is provided on the auxiliary valve body 29. In this way, the solenoid valve for an activity test of an extraction check valve is good in heat dissipation effect, and the service life is greatly prolonged.

In some examples, as shown in FIGS. 2-3, the heat dissipation grille 26 is disposed on the side of the auxiliary valve body 29.

In some examples, the main valve body 2 and the auxiliary valve body 29 are connected through a bolt 1. In this way, the main valve body 2 and the auxiliary valve body 29 are convenient to dismantle.

In some examples, the main valve includes a main valve sleeve 3, a main valve core 4 and a first drive coil 7. The first drive coil 7 is disposed on one side of the main valve body 2, the first drive coil 7 is used for driving the main valve core 4 to move, the main valve sleeve 3 is disposed inside the main valve body 2, and the main valve core 4 is disposed inside the main valve sleeve 3; the third air passage 23, the second air passage 24 and the third air passage 25 are in communication with the main valve sleeve 3, two first shoulders 5 are disposed on the outer surface of the main valve core 4 in the axial direction of the main valve core 4, and the outer surface of each of the first shoulders 5 is attached to the inner surface of the main valve sleeve 3.

In specific use, the first drive coil 7 drives the main valve core 4 to move, the position of the first shoulder 5 inside the main valve core 4 changes, the first shoulder 5 is used for switching the moving direction of airflow, so that the airflow passes through the main valve sleeve 3 and enters the second air passage 24 or the third air passage 25.

In some examples, a first spring 6 is disposed between the inner bottom end of the main valve sleeve 3 and the main valve core 4. In this way, the main valve core 4 can return quickly and accurately.

In some examples, the first auxiliary valve includes a first auxiliary valve sleeve 8 and a first auxiliary valve core 9, where the first auxiliary valve sleeve 8 is disposed inside the auxiliary valve body 29, one end of the first auxiliary valve core 9 extends into the auxiliary valve sleeve, the first auxiliary valve sleeve 8 is in communication with the second air passage 24 and the third air passage 25, two second shoulders 10 are disposed on the outer surface of the first auxiliary valve core 9 in the axial direction of the first auxiliary valve core 9, and the outer surface of each of the second shoulders 10 is attached to the inner surface of the first auxiliary valve sleeve 8.

In specific use, the first auxiliary valve core 9 is manually pushed to move, and the position of the second shoulder 10 inside the first auxiliary valve core 9 changes. The second shoulder 10 is used for switching the moving direction of airflow, so that the airflow passes through the first auxiliary valve sleeve 8 and enters the second air passage 24 or the third air passage 25.

In some examples, one side of the auxiliary valve body 29 is provided with a limiting cavity 12, the other end of the first auxiliary valve core 9 is connected to a manual push rod 28, the manual push rod 28 passes through the limiting cavity 12 and extends out, a limiting block 13 is circumferentially disposed on the outer surface of the manual push rod 28, and the limiting block 13 is clamped in the limiting cavity 12.

In specific use, the first auxiliary valve core 9 moves to drive the limiting block 13 to move in the limiting cavity 12, the limiting cavity 12 is used for limiting the axial movement of the first auxiliary valve core 9 to prevent the first auxiliary valve core 9 from being disengaged from the first auxiliary valve sleeve 8.

In some examples, the first auxiliary valve further includes a second spring 11 and a third spring 14, where the second spring 11 is disposed between the inner bottom end of the first auxiliary valve sleeve 8 and the first auxiliary valve core 9, the manual push rod 28 is sleeved with the third spring 14, and the third spring 14 is disposed between the inner bottom end of the limiting cavity 12 and the limiting block 13. In this way, the first auxiliary valve core 9 can return quickly and accurately, and the arrangement of the dual springs ensures that the first auxiliary valve core 9 returns more quickly.

In some examples, the second auxiliary valve includes a second auxiliary valve sleeve 16, a second auxiliary valve core 17 and a second drive coil 15, where the second drive coil 15 is disposed on one side of the auxiliary valve body 29, the second drive coil 15 is used for driving the second auxiliary valve core 17 to move, the second auxiliary valve sleeve 16 is disposed inside the auxiliary valve body 29, the second auxiliary valve core 17 is disposed inside the second auxiliary valve sleeve 16, the second auxiliary valve sleeve 16 is in communication with the second air passage 24 and the third air passage 25; two third shoulders 18 are disposed on the outer surface of the second auxiliary valve core 17 in the axial direction of the second auxiliary valve core 17, and the outer surface of each of the third shoulders 18 is attached to the inner surface of the second auxiliary valve sleeve 16.

In specific use, the second drive coil 15 drives the second auxiliary valve core 17 to move, the position of the third shoulder 18 inside the second auxiliary valve core 17 changes, and the third shoulder 18 is used for switching the moving direction of airflow, so that the airflow passes through the second auxiliary valve sleeve 16 and enters the second air passage 24 or the third air passage 25.

In some examples, the second auxiliary valve includes a fourth spring 19, the fourth spring 19 is disposed between the inner bottom end of the second auxiliary valve sleeve 16 and the second auxiliary valve core 17 such that the second auxiliary valve core 17 can return quickly and accurately.

In some examples, the main valve sleeve 3 is mounted in the main valve body 2 through an O-shaped seal ring 27. The first auxiliary valve sleeve 8 and the second auxiliary valve sleeve 16 are mounted in the auxiliary valve body 29 through the O-shaped seal ring 27. The surfaces of the main valve core 4, the first auxiliary valve core 9 and the second auxiliary valve core 17 are polished. In this way, the device is sealed closely, and the air tightness is good.

In addition, the devices or components of different functions in the above various examples may be combined. For example, the solenoid valve for an activity test of an extraction check valve in a preferred example of the present disclosure includes a main valve, a first auxiliary valve, a second auxiliary valve, a main valve body 2 and an auxiliary valve body 29, where the main valve body 2 and the auxiliary valve body 29 are axially parallel and connected through a bolt 1, and the main valve is mounted on the main valve body 2; the first auxiliary valve and the second auxiliary valve are mounted on the auxiliary valve body 29, the auxiliary valve body 29 is provided with an air inlet 20, a cylinder port 21 and an air discharging port 22; and a heat dissipation grille 26 is disposed on the side of the auxiliary valve body 29. The main valve includes a main valve sleeve 3, a main valve core 4 and a first drive coil 7. The first drive coil 7 is disposed on one side of the main valve body 2, the first drive coil 7 is used for driving the main valve core 4 to move, the main valve sleeve 3 is disposed inside the main valve body 2 through an O-shaped seal ring 27, and the main valve core 4 is disposed inside the main valve sleeve 3. Two first shoulders 5 are disposed on the outer surface of the main valve core 4 in the axial direction of the main valve core 4, and the outer surface of each of the first shoulders 5 is attached to the inner surface of the main valve sleeve 3. The surface of the main valve core 4 is polished. A first spring 6 is disposed between the inner bottom end of the main valve sleeve 3 and the main valve core 4. The first auxiliary valve includes a first auxiliary valve sleeve 8 and a first auxiliary valve core 9, where the first auxiliary valve sleeve 8 is disposed inside the auxiliary valve body 29 through an O-shaped seal ring 27, and one end of the first auxiliary valve core 9 extends into the auxiliary valve sleeve. Two second shoulders 10 are disposed on the outer surface of the first auxiliary valve core 9 in the axial direction of the first auxiliary valve core 9, and the outer surface of each of the second shoulders 10 is attached to the inner surface of the first auxiliary valve sleeve 8. The surface of the first auxiliary valve core 9 is polished. One side of the auxiliary valve body 29 is provided with a limiting cavity 12, the other end of the first auxiliary valve core 9 is connected to a manual push rod 28, the manual push rod 28 passes through the limiting cavity 12 and extends out, a limiting block 13 is circumferentially disposed on the outer surface of the manual push rod 28, and the limiting block 13 is clamped in the limiting cavity 12. The first auxiliary valve further includes a second spring 11 and a third spring 14, where the second spring 11 is disposed between the inner bottom end of the first auxiliary valve sleeve 8 and the first auxiliary valve core 9. The manual push rod 28 is sleeved with the third spring 14, and the third spring 14 is disposed between the inner bottom end of the limiting cavity 12 and the limiting block 13. The second auxiliary valve includes a second auxiliary valve sleeve 16, a second auxiliary valve core 17 and a second drive coil 15, where the second drive coil 15 is disposed on one side of the auxiliary valve body 29, and the second drive coil 15 is used for driving the second auxiliary valve core 17 to move. The second auxiliary valve is mounted inside the auxiliary valve body 29 through a seal ring, the second auxiliary valve core 17 is disposed inside the second auxiliary valve sleeve 16, and the second auxiliary valve sleeve 16 is in communication with a second air passage 24 and a third air passage 25. Two third shoulders 18 are disposed on the outer surface of the second auxiliary valve core 17 in the axial direction of the second auxiliary valve core 17, and the outer surface of each of the third shoulders 18 is attached to the inner surface of the second auxiliary valve sleeve 16. The surface of the second auxiliary valve core 17 is polished. The second auxiliary valve includes a fourth spring 19, and the fourth spring 19 is disposed between the inner bottom end of the second auxiliary valve sleeve 16 and the second auxiliary valve core 17. The air inlet 20 is communication with the main valve sleeve 3 through a first air passage 23. The cylinder port 21 is sequentially in communication with the second auxiliary valve sleeve 16, the first auxiliary valve sleeve 8 and the main valve sleeve 3 through the second air passage 24, and the air discharging port 22 is sequentially in communication with the second auxiliary valve sleeve 16, the first auxiliary valve sleeve 8 and the main valve sleeve 3 through the third air passage 25.

It should be noted that when the main valve sleeve 3 is arranged in a manner as shown in FIG. 1, a left end thereof is a bottom end; when the first auxiliary valve sleeve 8 is arranged in a manner as shown in FIG. 1, a left end thereof is a bottom end; and when the second auxiliary valve sleeve 16 is arranged in a manner as shown in FIG. 1, a left end thereof is a bottom end.

Several examples are used for illustration of the principles and implementation methods of the present disclosure. The description of the examples is used to help illustrate the method and its core principles of the present disclosure. In addition, those skilled in the art can make various modifications in terms of specific examples and scope of application in accordance with the teachings of the present disclosure. In conclusion, the content of this specification shall not be construed as a limitation to the present disclosure.

What is claimed is:

1. A solenoid valve for an activity test of an extraction check valve, comprising:
    a main valve;
    a first auxiliary valve;
    a second auxiliary valve;
    a main valve body; and
    an auxiliary valve body,
    wherein the main valve body and the auxiliary valve body are axially parallel and detachably connected, the main valve is mounted on the main valve body, the first auxiliary valve and the second auxiliary valve are mounted on the auxiliary valve body, and the auxiliary valve body is provided with an air inlet, a cylinder port and an air discharging port; the air inlet is in communication with the main valve through a first air passage, the cylinder port is sequentially in communication with the second auxiliary valve, the first auxiliary valve and the main valve through a second air passage, and the air discharging port is sequentially in communication with the second auxiliary valve, the first auxiliary valve and the main valve through a third air passage; the main valve and the second auxiliary valve are solenoid valves, and the first auxiliary valve is a hand-operated valve.

2. The solenoid valve for an activity test of an extraction check valve according to claim 1, wherein a heat dissipation grille is provided on the auxiliary valve body.

3. The solenoid valve for an activity test of an extraction check valve according to claim 2, wherein the heat dissipation grille is disposed on the side of the auxiliary valve body.

4. The solenoid valve for an activity test of an extraction check valve according to claim 1, wherein the main valve body is connected to the auxiliary valve body through a bolt.

5. The solenoid valve for an activity test of an extraction check valve according to claim 1, wherein the main valve comprises a main valve sleeve, a main valve core and a first drive coil; the first drive coil is disposed on one side of the main valve body, the first drive coil is used for driving the main valve core to move, the main valve sleeve is disposed inside the main valve body, and the main valve core is disposed inside the main valve sleeve; the first air passage, the second air passage and the third air passage are in communication with the main valve sleeve, two first shoulders are disposed on the outer surface of the main valve core in the axial direction of the main valve core, and the outer surface of each of the first shoulders is attached to the inner surface of the main valve sleeve.

6. The solenoid valve for an activity test of an extraction check valve according to claim 5, wherein a first spring is disposed between the inner bottom end of the main valve sleeve and the main valve core.

7. The solenoid valve for an activity test of an extraction check valve according to claim 1, wherein the first auxiliary valve comprises a first auxiliary valve sleeve and a first auxiliary valve core, wherein the first auxiliary valve sleeve is disposed inside the auxiliary valve body, one end of the first auxiliary valve core extends into the auxiliary valve sleeve, the first auxiliary valve sleeve is in communication with the second air passage and the third air passage, two second shoulders are disposed on the outer surface of the first auxiliary valve core in the axial direction of the first auxiliary valve core, and the outer surface of each of the second shoulders is attached to the inner surface of the first auxiliary valve sleeve.

8. The solenoid valve for an activity test of an extraction check valve according to claim 7, wherein one side of the auxiliary valve body is provided with a limiting cavity, the other end of the first auxiliary valve core is connected to a manual push rod, the manual push rod passes through the limiting cavity and extends out, a limiting block is circumferentially disposed on the outer surface of the manual push rod, and the limiting block is clamped in the limiting cavity; the first auxiliary valve further comprises a second spring and a third spring, wherein the second spring is disposed between the inner bottom end of the first auxiliary valve sleeve and the first auxiliary valve core, the manual push rod is sleeved with the third spring, and the third spring is disposed between the inner bottom end of the limiting cavity and the limiting block.

9. The solenoid valve for an activity test of an extraction check valve according to claim 1, wherein the second auxiliary valve comprises a second auxiliary valve sleeve, a second auxiliary valve core and a second drive coil, wherein the second drive coil is disposed on one side of the auxiliary valve body, the second drive coil is used for driving the second auxiliary valve core to move, the second auxiliary valve sleeve is disposed inside the auxiliary valve body, the second auxiliary valve core is disposed inside the second auxiliary valve sleeve, the second auxiliary valve sleeve is in communication with the second air passage and the third air passage; two third shoulders are disposed on the outer surface of the second auxiliary valve core in the axial direction of the second auxiliary valve core, and the outer surface of each of the third shoulders is attached to the inner surface of the second auxiliary valve sleeve.

10. The solenoid valve for an activity test of an extraction check valve according to claim 9, wherein the second auxiliary valve comprises a fourth spring and the fourth spring is disposed between the inner bottom end of the second auxiliary valve sleeve and the second auxiliary valve core.

* * * * *